3,404,641
RAILWAY TRUCK SIDE FRAME HAVING A FULCRUM IN A WINDOW

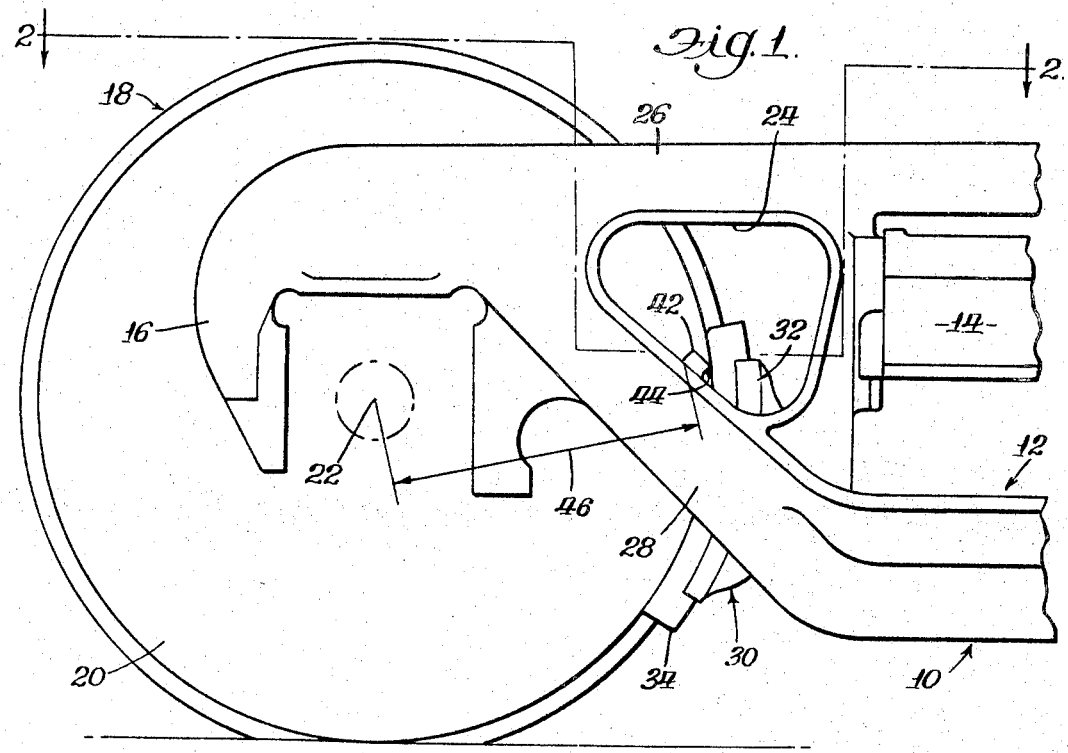
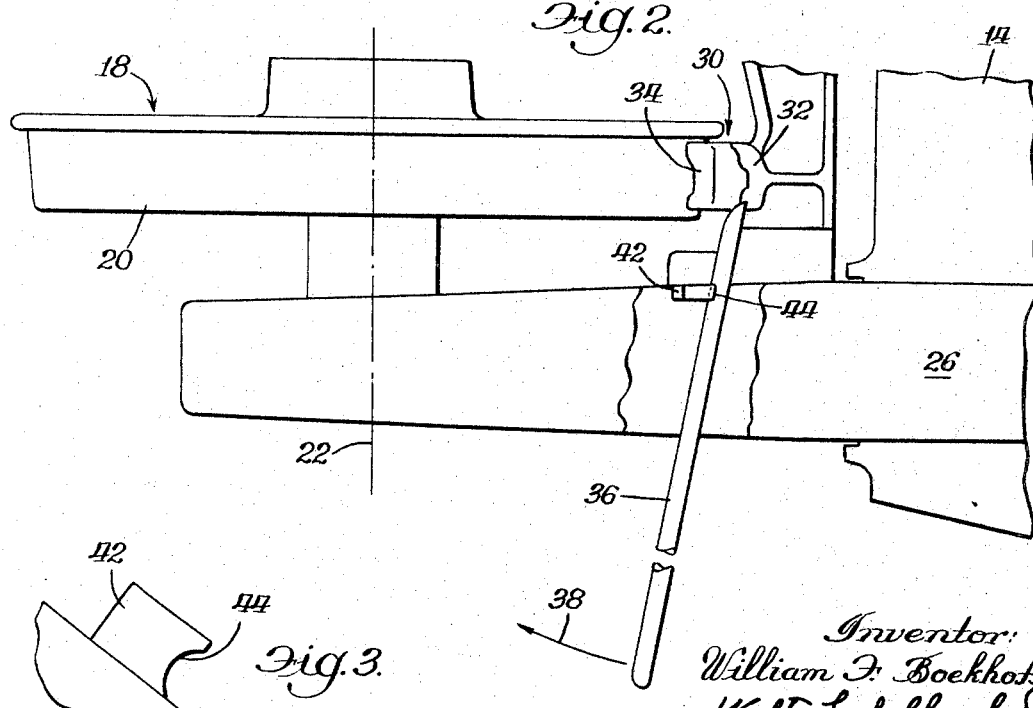

William F. Boekhoff, St. Louis, Mo., assignor to Amsted Industries Incorporated, Chicago, Ill., a corporation of New Jersey
Filed July 25, 1966, Ser. No. 567,522
3 Claims. (Cl. 105—205)

ABSTRACT OF THE DISCLOSURE

A fulcrum projection is cast onto the tension member of a railway truck side frame within a side window of the frame. The projection is a pivotal point for a track bar used in prying stuck brake rigging away from the periphery of the wheels.

---

The present invention relates to a railway car side frame with a fulcrum element formed in the window.

It often happens that a brake shoe must be removed or separated from its associated wheel by manual manipulation and this is done by means of a track bar. The brake shoe, or at least one of them, is in line with the window usually provided in the side frame. In applying the track bar to the brake shoe for releasing it from the wheel, the track bar is inserted through the window and its inner end hooked against the brake shoe, or the holder therefor, and then worked against a fixed element. Because of the shape and size of the side frame as they have previously been made, and the size of the wheels, an effective reaction point does not exist.

An object of the present invention therefore is to provide on one of the elements of the side frame a means or projection which provides a fulcrum or reaction surface facing in the appropriate direction for engagement by the track bar which enables the user to pry the track bar thereagainst and effectively release the brake shoe from the wheel.

Other objects and advantages of the invention will appear from the following detail description taken in conjunction with the accompanying drawings wherein:

FIGURE 1 is a side view of a railway car side frame, and associated wheel and brake means, embodying the features of the present invention;

FIGURE 2 is a view taken at line 2—2 of FIGURE 1; and

FIGURE 3 is a large side detail view of the fulcrum element, oriented according to FIGURE 1.

Referring now in detail to the accompanying drawing, a railway car side frame as indicated in its entirety at 10 includes a central window 12 for receiving one end of a bolster 14 and ends 16 (one shown) mounted on and supported by wheel and axle assemblies 18. The wheel and axle assembly shown includes a wheel 20 having an axis of rotation 22, it being understood that only one-half of the arrangement is shown, the other half being the same as or symmetrical to that shown. The side frame 10 includes a window 24 at each end defined at the top by a compression member 26, and at the bottom by a diagonal tension member 28 which is in the neighborhood of 45° to the horizontal. The window 24 is provided as the result of the design of the side frame from the standpoint of maximum strength consistent with minimum material used in making it.

A brake shoe assembly is shown at 30 and includes a holder or carrier 32 and a brake shoe 34. The brake shoe assembly itself is of known kind, and is one of a plurality of such brake shoe assemblies applied to the various wheels in the truck in which the side frame is incorporated. This truck may include for example four wheels, two on each side, or six wheels, etc., and the brake shoe assemblies on the various wheels in each truck are in a single brake rigging assembly. Perhaps only one of the brake shoe assemblies need be separated from the wheel as a result of which the others are automatically separated from their wheels, but in any case one brake shoe assembly is to be separated from its corresponding wheel, and the construction of the present invention is designed for accomplishing that purpose.

The brake shoe assembly 30, or at least a portion of it, is in line with, or in register with, the window 24, and when it is so applied to the wheel, and it is later desired to remove it therefrom, a track bar 36 is inserted through the window 24 and hooked against an element of the brake shoe assembly such as the holder 32. The user then works the outer end in the appropriate direction as indicated by the arrow 38. Usually only the upper portion of the brake shoe assembly is in line with the window, as shown in FIGURE 1. The force for separating the brake shoe assembly from the wheel is applied in a generally outward direction, but because of the construction of the side frame, it is impossible to find a point of reaction below the side frame, and in the window 24 the diagonal piece 28 does not provide the desired point of reaction.

In accordance with the present invention, a fulcrum element or projection 42 is provided in the window, and preferably on the diagonal piece 28, as an integral extension of the casting of the side frame. This projection provides a fulcrum or reaction surface 44 which may be concave on its surface facing the track bar in prying position of the latter. The fulcrum element or projection 42 rises from the surface of the diagonal element 28 the desired extent to accommodate the track bar.

The projection is located at a distance from the axis of the wheel, as indicated by the arrow 46, according to the diameter of the wheel to be used in the truck in which the side frame is to be used.

It is also within the compass of the invention to provide the fulcrum element or projection on the under surface of the diagonal element 28, if desired, with a reaction surface presented in the appropriate direction for prying the track bar thereagainst for releasing the brake shoe assembly in corresponding direction, which in the present instance would be to the right and downwardly as viewed in FIGURE 1. It is also within the compass of the invention that the projection be formed on the under surface of the top tension element 26 and have a reaction surface facing in appropriate direction.

While I have herein disclosed a preferred form of the invention, it will be understood that changes may be made therein within the scope of the appended claims.

I claim:

1. In a railway car side frame utilized in a railway car truck having wheel and axle assemblies and brake rigging, said side frame including a window defined by a compression member, a column member and a tension member and said brake rigging including a brake shoe assembly having a brake shoe engageable with the periphery of a wheel proximate said window, the improvement comprising a projecting, fulcrum element secured to one of said members in said window proximate said brake shoe assembly whereby the end of a bar may be placed against said brake shoe assembly and the bar pivoted against said fulcrum to move said brake shoe away from the periphery of said wheel.

2. The invention set out in claim 1 wherein said projection is secured to the tension member.

3. In a railway car side frame utilized in a railway car truck having wheel and axle assemblies and brake rigging, said side frame having a compression member and an arcuate tension member interconnected proximate their ends and said brake rigging including a brake shoe assembly having a brake shoe engageable with the periphery of a wheel proximate said arcuate tension member, the improvement comprising a projecting, fulcrum element secured to said arcuate tension member proximate said engagement of said brake shoe and said wheel, said element being usable as a pivotal point for a bar used to pry said brake shoe away from said wheel.

References Cited

UNITED STATES PATENTS

| | | | |
|---|---|---|---|
| 2,378,538 | 6/1945 | Dath | 188—33 |
| 2,889,784 | 6/1959 | Shafer | 105—197 |
| 3,218,990 | 11/1965 | Weber | 105—197 |
| 3,254,612 | 6/1966 | Shafer | 105—197 |
| 3,261,305 | 7/1966 | Shafer | 105—197 |

ARTHUR L. LA POINT, *Primary Examiner.*

H. BELTRAN, *Assistant Examiner.*